(12) United States Patent
Orsley

(10) Patent No.: US 8,278,571 B2
(45) Date of Patent: Oct. 2, 2012

(54) CAPACITIVE TOUCHSCREEN OR TOUCHPAD FOR FINGER AND ACTIVE STYLUS

(75) Inventor: Timothy J. Orsley, San Jose, CA (US)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 580 days.

(21) Appl. No.: 12/418,181

(22) Filed: Apr. 3, 2009

(65) Prior Publication Data

US 2010/0252335 A1 Oct. 7, 2010

(51) Int. Cl.
*G09G 3/41* (2006.01)

(52) U.S. Cl. .............. 178/18.03; 345/173; 345/179; 178/19.01

(58) Field of Classification Search .............. 345/168, 345/169, 173–182; 178/18.01–20.01
See application file for complete search history.

(56) References Cited

U.S. PATENT DOCUMENTS

| | | | |
|---|---|---|---|
| 2,381,174 A | 8/1945 | Massa | |
| 4,157,741 A | 6/1979 | Goldwater | |
| 4,524,846 A | 6/1985 | Whitby | |
| 4,550,221 A | 10/1985 | Mabush et al. | |
| 4,686,332 A | 8/1987 | Greanias | |
| 4,836,327 A | 6/1989 | Andrews et al. | |
| 5,025,886 A | 6/1991 | Jung | |
| 5,117,462 A | 5/1992 | Bie | |
| 5,138,118 A * | 8/1992 | Russell | 178/19.03 |
| 5,206,465 A | 4/1993 | Jung | |
| 5,305,017 A | 4/1994 | Gerpheide | |
| 5,526,456 A | 6/1996 | Heinz | |
| 5,543,588 A | 8/1996 | Bisset et al. | |
| 5,543,589 A | 8/1996 | Buchana et al. | |
| 5,670,755 A | 9/1997 | Kwon | |
| 5,844,506 A | 12/1998 | Binstead | |
| 5,861,875 A | 1/1999 | Gerpheide | |
| 5,898,788 A | 4/1999 | Kim | |
| 5,920,309 A | 7/1999 | Bisset et al. | |
| 6,002,389 A | 12/1999 | Kasser | |
| 6,028,947 A | 2/2000 | Faraone et al. | |

(Continued)

FOREIGN PATENT DOCUMENTS

WO    WO-03/063005    7/2003

(Continued)

OTHER PUBLICATIONS

"Avago Technologies AMRI-2000 Data Sheet", unknown author and date.

(Continued)

*Primary Examiner* — Sumati Lefkowitz
*Assistant Examiner* — Rodney Amadiz
(74) *Attorney, Agent, or Firm* — Winston Hsu; Scott Margo

(57) ABSTRACT

There is provided an electronic device having a mutual capacitance touchscreen or touchpad having combined finger navigation and active stylus navigation and character entry capabilities. According to one such embodiment, first and second pluralities of sense and drive electrodes are disposed in or on at least one substrate, and form an array configured to permit a first location corresponding to a finger or a second location corresponding to an active stylus to be detected thereby. The drive electrodes in the array are configured to operate as drive electrodes when the touchscreen or touchpad operates in a first finger touch mode, and to operate as additional sense electrodes when the touchscreen or touchpad operates in a second active stylus mode.

27 Claims, 8 Drawing Sheets

U.S. PATENT DOCUMENTS

| | | | |
|---|---|---|---|
| 6,097,991 | A | 8/2000 | Hamel et al. |
| 6,377,249 | B1* | 4/2002 | Mumford ................... 345/179 |
| 6,389,144 | B1 | 5/2002 | Lee |
| 6,528,741 | B2 | 3/2003 | Walker |
| 6,628,796 | B2 | 9/2003 | Adamson |
| 6,658,127 | B1 | 12/2003 | Kim |
| 6,784,876 | B1* | 8/2004 | Nagai et al. ................ 345/178 |
| 6,879,930 | B2 | 4/2005 | Sinclair |
| 6,981,570 | B2 | 1/2006 | Dalbec |
| 7,014,099 | B2 | 3/2006 | Crisan |
| 7,158,117 | B2* | 1/2007 | Sato et al. .................. 345/158 |
| 7,177,437 | B1 | 2/2007 | Adams |
| 7,202,859 | B1 | 4/2007 | Speck |
| 7,436,393 | B2 | 10/2008 | Hong et al. |
| 7,466,837 | B2 | 12/2008 | Nakamura |
| 7,538,760 | B2 | 5/2009 | Hotelling et al. |
| 7,650,006 | B2 | 1/2010 | Isotalo |
| 2003/0025679 | A1 | 2/2003 | Taylor et al. |
| 2004/0264690 | A1 | 12/2004 | Coates |
| 2005/0057534 | A1* | 3/2005 | Charlier .................. 345/179 |
| 2005/0171714 | A1* | 8/2005 | Ely et al. ..................... 702/75 |
| 2006/0062420 | A1 | 3/2006 | Araki |
| 2006/0097991 | A1 | 5/2006 | Hotelling et al. |
| 2007/0139359 | A1 | 6/2007 | Voelckers |
| 2007/0195069 | A1* | 8/2007 | Kable et al. .............. 345/179 |
| 2007/0229464 | A1 | 10/2007 | Hotelling et al. |
| 2007/0257890 | A1 | 11/2007 | Hotelling et al. |
| 2007/0273673 | A1* | 11/2007 | Park et al. ................ 345/179 |
| 2008/0042985 | A1 | 2/2008 | Katsuhito et al. |
| 2008/0055256 | A1 | 3/2008 | Kwong et al. |
| 2008/0055279 | A1* | 3/2008 | Osada et al. .............. 345/179 |
| 2008/0158178 | A1* | 7/2008 | Hotelling et al. ......... 345/173 |
| 2008/0246496 | A1 | 10/2008 | Hristov et al. |
| 2009/0135918 | A1 | 5/2009 | Mak-Fan |
| 2009/0231305 | A1 | 9/2009 | Hotelling et al. |
| 2009/0255737 | A1 | 10/2009 | Chang et al. |
| 2009/0267920 | A1 | 10/2009 | Faubert |
| 2010/0006350 | A1* | 1/2010 | Elias ......................... 178/18.06 |

FOREIGN PATENT DOCUMENTS

| | | |
|---|---|---|
| WO | WO-03/063006 | 7/2003 |

OTHER PUBLICATIONS

Alternative Method Research, , "Phone Keyboard—> Phone Keyboard Statistics", http://phonekeyboard.com/.

Breen, Christopher , "Microsoft Zune Impressions—part 1", http://www.digitalartsonline.co.uk/blogs/index.cfm?blogid=2&entryid=184 Dec. 4, 2006 , 1-4.

U.S. Appl. No. 11/945,832, filed Nov. 27, 2007, Harley.

* cited by examiner

US 8,278,571 B2

CAPACITIVE TOUCHSCREEN OR TOUCHPAD FOR FINGER AND ACTIVE STYLUS

FIELD OF THE INVENTION

Various embodiments of the invention disclosed herein relate to the field of input devices generally, and more specifically to combined mutual capacitance and radio-frequency ("RF") measurement or sensing systems, devices, components and methods finding particularly efficacious applications in touchscreen or touchpad devices for portable electronic devices. Embodiments of the invention described herein include those amenable for use with a finger and an active stylus in portable or hand-held devices such cell phones, MP3 players, personal computers, game controllers, laptop computers, PDA's and the like. Some of the embodiments disclosed herein may be configured or adapted for use in stationary applications such as in industrial controls, washing machines, exercise equipment, and the like.

BACKGROUND

Resistive touchscreens and touchpads are known in the prior art, and often find application in touchscreens or touchpads that work in conjunction with a stylus. When the stylus is pressed downwardly against the touchscreen or touchpad, upper and lower resistive electrodes are brought into contact with one another and the location of the stylus is determined by calculating the location where the two arrays have shorted out. Resistive touchscreens typically attenuate light passing therethrough substantially owing to the relatively large amounts of Indium Tin Oxide ("ITO") required to form the resistive electrodes thereof.

Capacitive touchscreens, such as those found in IPHONEs™ provide two advantages respecting resistive touchscreens. First, they function with almost no pressure being applied by a finger, so they do not present problems associated with stiction and are comfortable to use. This is particularly important for swipe and pinch gestures, where the finger has to slide over a touch surface. Second, some capacitive touchscreens support the measurement of multiple finger locations simultaneously (commonly known as "multi-touch" capability).

The primary technical drawback of a traditional capacitive touchscreen or touchpad is the lack of support for a stylus (in addition to a finger). A stylus provides a more precise pointing device, permits the entry of complicated text and characters, and does not obscure the target as much as a finger. Although capacitive touchscreens have been made to work with a stylus, it is believed this has only been accomplished with an electrically conductive stylus having a tip size comparable to that of a human finger. This, of course, can defeat the benefits arising from using a stylus.

Another important aspect of touchscreens and touchpads has to do with the particular type of technology employed in sensing and measuring changes in capacitance. Two principal capacitive sensing and measurement technologies currently find use in most touchpad and touchscreen devices. The first such technology is that of self-capacitance. By way of example, many devices manufactured by SYNAPTICS™ employ self-capacitance measurement techniques, as do integrated circuit (IC) devices such as the CYPRESS PSOC.™ Self-capacitance involves measuring the self-capacitance of a series of electrode pads using techniques such as those described in U.S. Pat. No. 5,543,588 to Bisset et al. entitled "Touch Pad Driven Handheld Computing Device" dated Aug. 6, 1996.

Self-capacitance is a measure of how much charge has accumulated on an object held at a given voltage (Q=CV). Self-capacitance is typically measured by applying a known voltage to an electrode, and then using a circuit to measure how much charge flows to that same electrode. When external grounded objects are brought close to the electrode, additional charge is attracted to the electrode. As a result, the self-capacitance of the electrode increases. Many touch sensors are configured such that the external grounded object is a finger. The human body is essentially a capacitor to ground, typically with a capacitance of around 100 pF.

Electrodes in self-capacitance touchpads are typically arranged in rows and columns. By scanning first rows and then columns the locations of individual disturbances induced by the presence of a finger, for example, can be determined. To effect accurate multi-touch measurements in a touchpad, however, it may be required that several finger touches be measured simultaneously. In such a case, row and column techniques for self-capacitance measurement can lead to inconclusive results. As a result, some prior art touchpad sensing systems suffer from a fundamental ambiguity respecting the actual positions of multiple objects placed simultaneously on or near the touchscreen.

One method of overcoming the foregoing problems in self-capacitance systems is to provide a system that does not employ a row and column scanning scheme, and that is instead configured to measure each touchpad electrode individually. Such a system is described in U.S. Patent Publication No. 2006/097991 to Hotelling et al. entitled "Multipoint touchscreen" dated May 11, 2006. In the touchpad sensing system disclosed in the foregoing patent publication to Hotelling, each electrode is connected to a pin of an integrated circuit ("IC"), either directly to a sense IC or via a multiplexer. As will become clear to those skilled in the art, however, individually wiring electrodes in such a system can add considerable cost to a self-capacitance system. For example, in an n×n grid of electrodes, the number of IC pins required is $n^2$. (The APPLE™ IPOD™ employs a similar capacitance measurement system.)

The number of electrodes in a self-capacitance system can be reduced by interleaving electrodes. Interleaving can create a larger region where a finger is sensed by two adjacent electrodes allowing better interpolation, and therefore fewer electrodes. Such patterns can be particularly effective in one dimensional sensors, such as those employed in IPOD clickwheels. See, for example, U.S. Pat. No. 6,879,930 to Sinclair et al. entitled "Capacitance touch slider" dated Apr. 12, 2005.

The second primary capacitive sensing and measurement technology employed in touchpad and touchscreen devices is that of mutual capacitance, where measurements are performed using a crossed grid of electrodes. See, for example, U.S. Pat. No. 5,861,875 to Gerpheide entitled "Methods and Apparatus for Data Input" dated Jan. 19, 1999 and above-referenced U.S. Patent Publication No. 2006/097991 to Hotelling et al. In mutual capacitance measurement, capacitance is measured between two conductors, as opposed to a self-capacitance measurement in which the capacitance of a single conductor is measured, and which may be affected by other objects in proximity thereto.

In some mutual capacitance measurement systems, an array of sense electrodes is disposed on a first side of a substrate and an array of drive electrodes is disposed on a second side of the substrate that opposes the first side, a column or row of electrodes in the drive electrode array is driven to a particular voltage, the mutual capacitance to a single row (or column) of the sense electrode array is measured, and the capacitance at a single row-column intersection is determined. By scanning all the rows and columns a map of capacitance measurements may be created for all the nodes in the grid. When a user's finger approaches a given grid point, some of the electric field lines emanating from or near the grid point are deflected, thereby typically decreasing the mutual capacitance of the two electrodes at the grid point. Because each measurement probes only a single grid intersection point, no measurement ambiguities arise with multiple touches as in the case of some self-capacitance systems. Moreover, to measure a grid of n×n intersections, only 2 n pins on an IC are needed in such a system.

Some solutions to the problems outlined above are provided by the devices and methods disclosed in U.S. patent application Ser. No. 12/183,456 to Harley entitled "Capacitive Touchscreen or Touchpad for Finger or Stylus" filed Jul. 31, 2008 (hereafter "the '456 patent application"). The devices and methods disclosed in the '456 patent application require, however, a panel or layer that may be deflected downwardly by a stylus into closer proximity with an underlying electrode array. Unfortunately, deflectable panels suitable for this purpose can result in an increased lack of reliability owing to indium tin oxide ("ITO") traces employed in such devices being thin and brittle, and consequently susceptible to breaking through repeated flexing.

What is needed is a finger touch and stylus capacitive touchscreen that features the advantages of mutual capacitance technology but avoids the disadvantages of self-capacitance technology and deflectable panels. What is also needed is a capacitive touchscreen or touchpad that has the zero-force finger multi-touch navigation capabilities of a traditional capacitive touchscreen in combination with stylus character and text entry and navigation capabilities similar to those provided by resistive touchscreens. What is further needed is a capacitive finger and stylus touchscreen or touchpad that does not absorb or otherwise excessively impede the transmission of light therethrough, and that has a smaller footprint, volume or thickness.

Further details concerning various aspects of some prior art devices and methods are set forth in: (1) U.S. Pat. No. 4,550,221 to Mabusth entitled "Touch Sensitive Control Device" dated Oct. 29, 1985; (2) U.S. Pat. No. 4,686,332 to Greanias entitled "Combined Finger Touch and Stylus Detection System for Use on the Viewing Surface of a Visual Display Device" dated Aug. 11, 1987; (3) U.S. Pat. No. 5,305,017 to Gerpheide entitled "Methods and Apparatus for Data Input" dated Apr. 19, 1994; (4) U.S. Pat. No. 5,670,755 to Kwon entitled "Information Input Apparatus Having Functions of Both Touch Panel and Digitizer, and Driving Method Therefor" dated Sep. 23, 1997; (5) U.S. Pat. No. 5,844,506 to Binstead entitled "Multiple Input Proximity Detector and Touchpad System" dated Dec. 1, 1998; (6) U.S. Pat. No. 6,002,389 to Kasser entitled "Touch and Pressure Sensing Method and Apparatus" dated Dec. 14, 1999; (7) U.S. Pat. No. 6,097,991 to Hamel et al. entitled "Automatic Identification of Audio Bezel" dated Aug. 1, 2000; (8) U.S. Pat. No. 6,879,930 to Sinclair et al. entitled "Capacitance Touch Sensor" dated Apr. 12, 2005; (9) U.S. Pat. No. 7,202,859 to Speck et al. entitled "Capacitive Sensing Pattern" dated Apr. 10, 2007; (10) U.S. Pat. No. 7,436,393 to Hong et al. entitled "Touch Panel for Display Device" dated Oct. 14, 2008; (11) U.S. Patent Publication No. 2006/0097991 A1 to Hotelling et al. entitled "Multipoint Touchscreen" dated May 11, 2006; (12) U.S. Patent Publication No. 2008/0042985 to Katsuhito et al. entitled "Information Processing Apparatus, Operation Input Method, and Sensing Device" dated Feb. 21, 2008; (13) U.S. Patent Publication No. 2008/0055256 to Kwong et al. entitled "Touch Screen Controller with Embedded Overlay" dated Mar. 6, 2008, and (14) U.S. Patent Publication No. 2008/0246496 to Hristov et al. entitled "Two-Dimensional Position Sensor" dated Oct. 9, 2008. Each of the patents and patent applications described hereinabove is hereby incorporated by reference herein, each in its respective entirety.

SUMMARY

In one embodiment, there is a provided an electronic device comprising a mutual capacitance combined finger and active stylus sensing touchscreen or touchpad comprising an outer touch surface, at least one substrate disposed beneath the touch surface, a first plurality of mutual capacitance drive electrodes arranged in first rows or columns on the at least one substrate, a second plurality of mutual capacitance sense electrodes arranged in second rows or columns on the at least one substrate, the first rows or columns not being parallel to the second rows or columns, electrode driving and sensing circuitry operably connected to the drive and sense electrodes and configured to permit at least some of the drive electrodes to be switchably configured thereby for operation as either drive electrodes in a first finger touch mode or as additional sense electrodes in a second active stylus mode, and an active stylus comprising stylus driving circuitry configured to emit an active signal from the active stylus when the touchscreen or touchpad is operating in the second mode, wherein the outer touch surface is configured for a user to place and move the finger or active stylus thereon and thereacross, the first and second pluralities of electrodes form an electrode array, and the electrode driving and sensing circuitry and the electrode array are together configured to permit a first finger position on the outer touch surface to be detected capacitively thereby when operating in the first mode and to detect a second active signal location on the outer touch surface to be detected capacitively thereby when operating in the second mode.

In another embodiment, there is provided a method of sensing a position of a finger or an active stylus on a touchscreen or touchpad comprising detecting a first position of the finger on the touchscreen or touchpad when a mutual capacitance changes between a first plurality of electrodes and a second plurality of electrodes near the first position, the first and second pluralities of electrodes forming an electrode array in the touchscreen or touchpad, and detecting a second position of the active stylus on the touchscreen or touchpad when an active signal emitted by the active stylus is detected by the first plurality of electrodes or the second plurality of electrodes near the second position.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings.

DETAILED DESCRIPTION OF SOME PREFERRED EMBODIMENTS

Incorporated by reference herein, each in its respective entirety, are: (1) U.S. patent application Ser. No. 12/024,057 to Harley et al. entitled "Single Layer Mutual Capacitance Sensing Systems, Devices, Components and Methods" filed Jan. 31, 2008; and (2) U.S. patent application Ser. No. 12/183,456 to Harley entitled "Capacitive Touchscreen or Touchpad for Finger or Stylus" filed Jul. 31, 2008.

Figure 1:
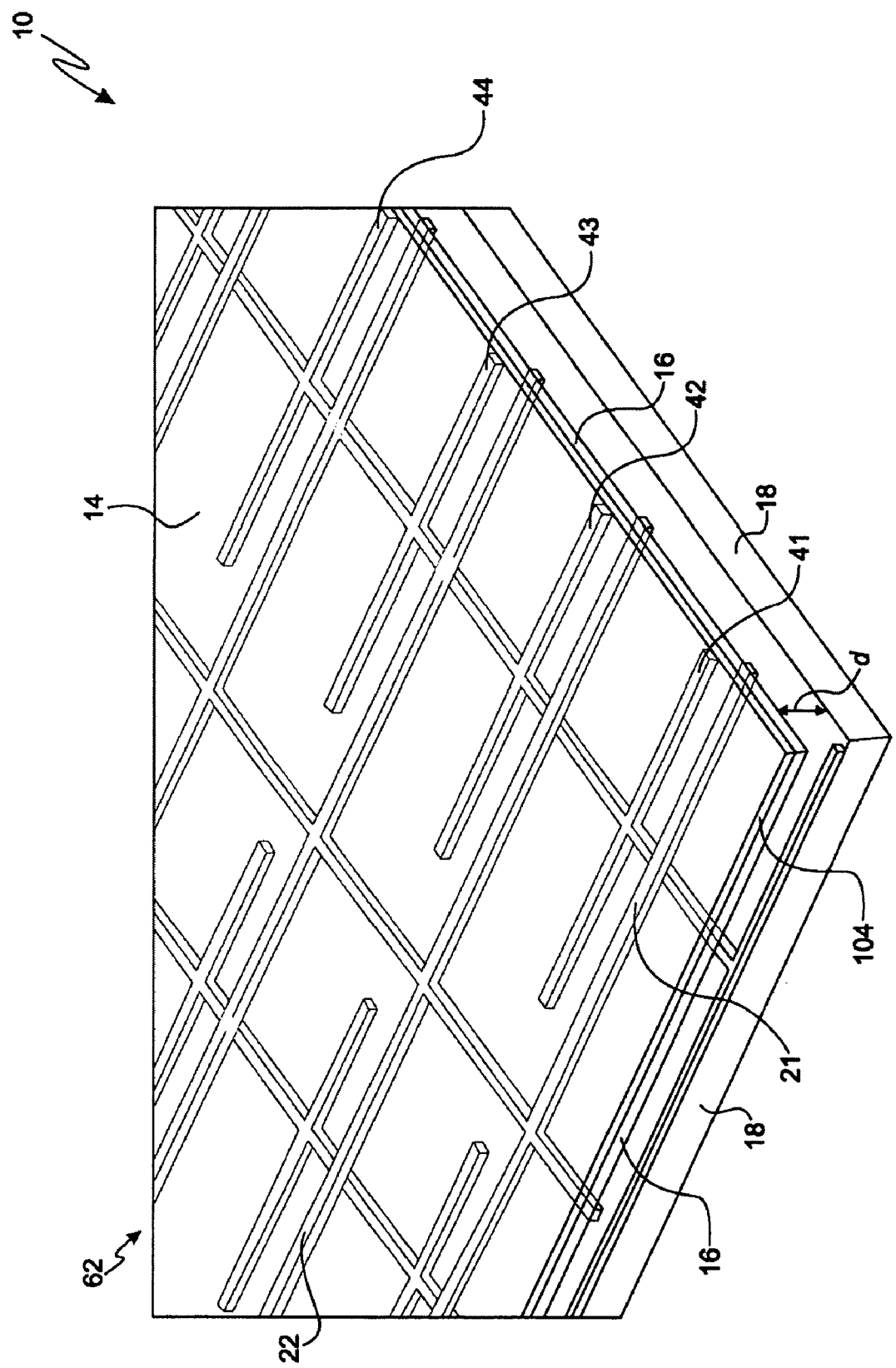
FIG. 1 shows a perspective view of a portion of one embodiment of a capacitive touchscreen or touchpad system 10 and corresponding electrode array 62.
Figure 2:
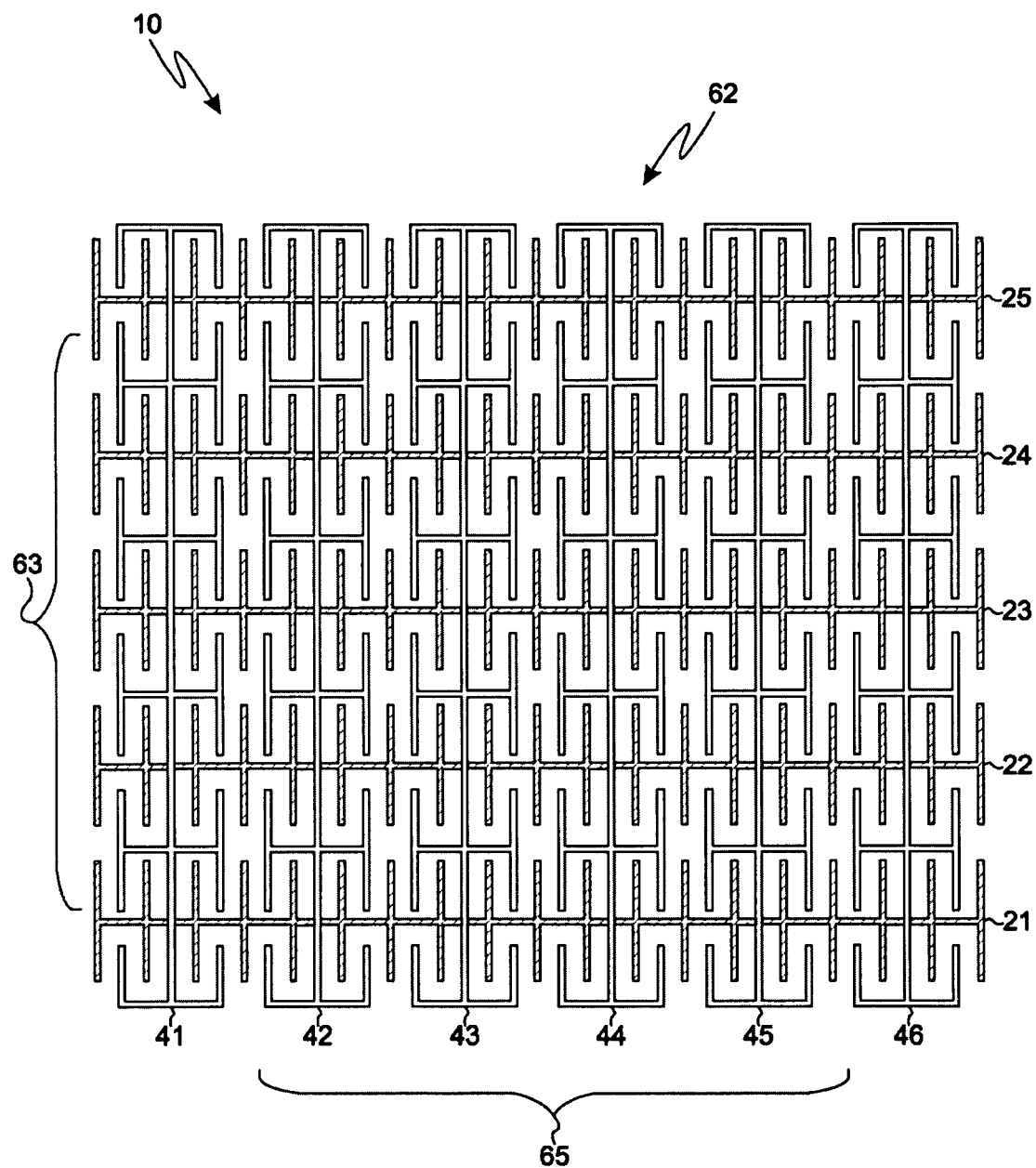
FIG. 2 shows a top plan view of the capacitive touchscreen or touchpad system 10 and corresponding electrode array 62 of FIG. 1.

Referring to FIGS. 1 through 2, in some embodiments, there is provided an electronic device 100 (see, e.g., FIG. 7) having mutual capacitance touchscreen or touchpad 10 having combined finger navigation and active stylus navigation and character entry capabilities. According to one such embodiment, first and second pluralities of sense and drive electrodes 65 and 63, respectively, are disposed in or on at least one substrate 16 and 18, and form an array 62 configured to permit a first location corresponding to a finger or a second location corresponding to an active stylus to be detected thereby. The drive electrodes in the array are configured to operate as drive electrodes when the touchscreen or touchpad operates in a first finger touch mode, and to operate as additional sense electrodes when the touchscreen or touchpad operates in a second active stylus mode. Note that other configurations of the sense and drive electrodes may be employed, such as disposing the sense and drive electrodes substantially in a single plane.

Continuing to refer to FIGS. 1 and 2, a mutual-capacitance touchscreen or touchpad 10 is disclosed having sense and drive electrodes disposed in opposing first and second substantially parallel planes on upper and lower, or lower and upper, substrates. In some embodiments, electrode array 62 covers the display substantially uniformly, and therefore does not cause any grid patterns to be visible on a display or screen. Since sensing measurements are based on mutual capacitance, however, a row and column sensing configuration can be employed, which can be employed to reduce the pin count to only 2 n for an n×n electrode grid. Furthermore, such an electrode array configuration is conducive to being arranged as interleaved fingers, which increases the ability to use interpolation techniques in determining a stylus or a user's finger location, and further reduces pin count requirements in respect of prior art mutual capacitance sensing or measurement systems.

FIGS. 1 and 2 illustrate one embodiment of mutual capacitive sensing touchscreen or touchpad 10, where electrode array 62 is configured on upper substrate 16 as a first plurality of electrodes and on lower substrate 18 as a second plurality of electrodes. Substrates 16 and 18 typically comprises glass, plastic, acrylic or any other suitable optically transparent material. The spacings between rows or columns of the first plurality of electrodes and the second plurality of electrodes most preferably ranges between about 1 mm and about 10 mm. The embodiments of touchscreen or touchpad 10 illustrated in FIGS. 1 through 3 most preferably operate, in accordance with the principles of mutual capacitance. Capacitances are established between individual sense and drive electrodes, e.g., electrodes 21-25 and 41-46, or between electrodes 41-46 and 21-25, as the case may be, by means of a drive waveform input to drive electrodes 21-25 or 41-46. In a first finger touch mode, a user's finger engages touch surface 14 of touch layer 104 (see FIGS. 1 and 3) that overlies array 62.

Figure 3:
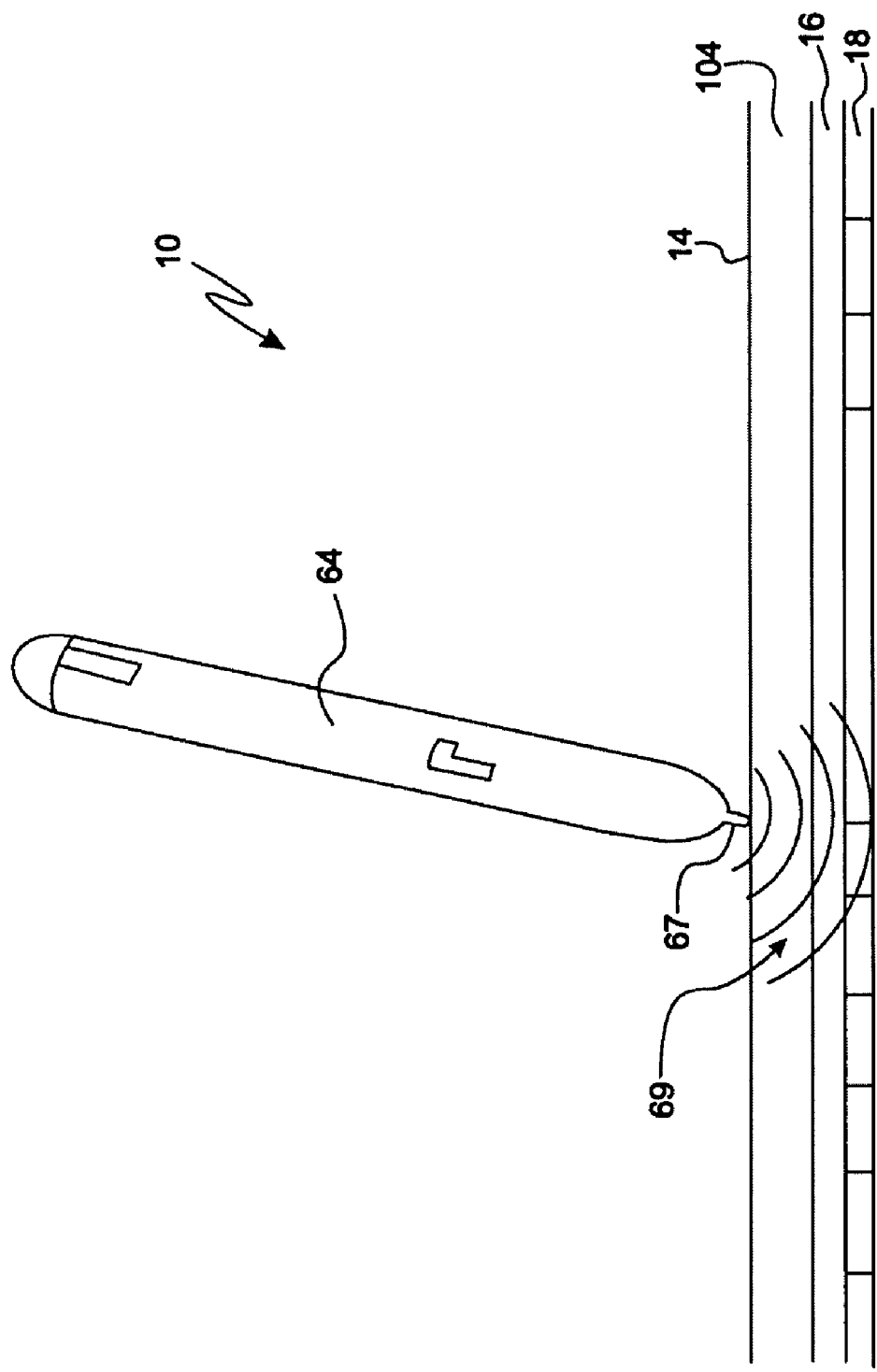
FIG. 3 shows a cross-sectional view of one embodiment of capacitive touchscreen or touchpad system 10 with active stylus 64.

In some embodiments, cover layer 104 is disposed over upper substrate 16 and between array 62 and the user's finger or stylus 64 (see, e.g., FIG. 3). In other embodiments (not shown in the drawings), upper substrate 16 alone is configured for the user's finger or stylus 64 to engage the top surface thereof, and cover layer 104 is eliminated altogether.

When in contact with or in close proximity to touch surface 14, and when touchscreen or touchpad 10 is operating in the first finger touch mode, the user's finger couples to the drive signal provided by a drive electrode in closest proximity thereto and proportionately generally reduces the amount of capacitance between such drive electrode and its corresponding nearby sense electrode. That is, as the user's finger moves across touch surface 14, the ratio of the drive signal coupled to the respective individual sense electrodes 41 through 46 through the finger is reduced and varied, thereby providing a two-dimensional measurement of a position of the user's finger above electrode array 62.

Note, however, that depending on the thickness of touch layer 104 and other factors, the capacitance between drive and sense electrodes can actually increase when a user's finger couples to the drive signal by being brought into proximity thereto. Thus, in the general case, it is more accurate to say that such capacitance changes when the user's finger is brought into proximity to the drive signal.

In such a manner, then, the capacitance at a single row-column intersection corresponding to the user's finger location is determined when touchscreen or touchpad 10 is operating in the first finger touch mode. By scanning all the rows and columns of array 62, a map of capacitance measurements may be created for all the nodes in the grid. Because each measurement probes only a single grid intersection point, no measurement ambiguities arise with multiple touches as in the case of some self-capacitance systems. Moreover, to measure a grid of n×n intersections, only 2 n pins on an IC are required in system 10 illustrated in FIGS. 1 through 3. Thus, touchscreen or touchpad 10 may be configured to scan rows 41-45 and 21-25 thereby to detect at least one location of the user's finger. Touchscreen or touchpad 10 may also be configured to multiplex signals provided by the rows and/or columns to a capacitance sensing circuit 72 (see, e.g., FIG. 4).

Note that either of the first and second pluralities of electrodes may be configured as drive or sense electrodes, and that such pluralities of electrodes may be configured as interleaved rows (as shown in FIGS. 1 and 2), as rows and columns that intersect one another in perpendicular fashion, or may assume any of a number of other electrode configurations known to those skilled in the art, or as disclosed in the above-referenced patents and patent applications.

Touchscreen or touchpad 10 may also be configured to sense multiple touch locations in electrode array 62 simultaneously or substantially simultaneously. In one embodiment a host computer is updated at a rate of, for example, 60 Hz; all the rows and columns of array 62 are scanned sequentially to determine the positions of any finger touches. Note that while operating in a first mode touchscreen or touchpad 10 may be configured to sense multiple finger touch locations substantially simultaneously over electrode array 62, but that only one active stylus location may be sensed at a time over electrode array 62 when touchscreen or touchpad 10 is operating in a second active stylus mode.

In the embodiment illustrated in FIGS. 1 and 2, sense electrodes 41-46 are arranged in columns, and drive electrodes 21-25 are arranged in rows, although electrodes 41-46 may also be configured as drive electrodes and electrodes 21-25 may be configured as sense electrodes. By way of example, during sensing electrode 21 is driven, and sense measurements are taken on all of electrodes 41-46. Next, drive electrode 22 is driven, followed by another series of sense measurements in sense electrodes 41-46.

Continuing to refer to FIGS. 1 and 2, electrode array 62 exhibits good drive and sense electrode interaction and sensitivity because electrostatic field lines are concentrated at the borders between adjoining individual drive and sense electrodes. The overall signal produced by electrode array 62 is increased by interleaving portions of individual drive and sense electrodes 21-25 and 41-46. It will now become apparent to those skilled in the art that many different electrode interleaving and electrode array configurations other than those shown or described explicitly in the drawings or specification hereof may be employed and yet fall within the scope of the invention.

In one embodiment employing the principles described above respecting FIGS. 1 and 2, the values of the individual capacitances associated with sense electrodes 41 through 46 and drive electrodes 21 through 25 mounted on substrates 16 and 18, respectively, are monitored or measured by capacitance sensing circuit 72 (see, e.g., FIG. 6), as are the operating states of any additional switches that might be provided in conjunction therewith. In a preferred embodiment, a 125 kHz square wave drive signal is applied to drive electrodes 21 through 26 by capacitance sensing circuit 72 (see, e.g., FIG. 6) so that the drive signal is applied continuously to electrodes 21 through 25, although those skilled in the art will understand that other types of drive signals may be successfully employed. Indeed, the drive signal need not be supplied by capacitance sensing circuit 72, and in some embodiments is provided by a separate drive signal circuit. In a preferred embodiment, however, the drive signal circuit and the capacitance sensing circuit are incorporated into a single circuit or integrated circuit.

Electrode array 62 may include one or more ground traces disposed, for example, between individual drive electrode 21 and individual sense electrode 41 in a single sensing cell. Direct coupling of an electrical field between drive electrode 21 and sense electrode 41 is thereby reduced so that the majority of the coupling field lines in the electrical field may be interrupted by a finger or stylus instead of being drawn directly between electrodes 21 and 41, an effect which may become especially pronounced in the presence of humidity or water vapor. Such an embodiment also blocks short strong electrical fields from projecting through an overlying glass or plastic layer, thereby reducing unwanted capacitance in system 10. In other embodiments, no such ground trace is included in electrode array 62. Further details concerning the use of a ground conductor may be found in U.S. patent application Ser. No. 11/945,832 to Harley entitled "Capacitive Sensing Input Device with Reduced Sensitivity to Humidity and Condensation" filed on Nov. 27, 2007, the entirety of which is hereby incorporated by reference herein.

In one embodiment, and as shown in FIG. 3, touch layer, cover glass or plastic layer 104 is disposed over electrode array 62, and is about 0.15 mm in thickness, and in preferred embodiments ranges between about 0.05 mm and about 0.5 mm in thickness. Electrode array 62 provides approximately a 0.25 pF change in capacitance upon a user's finger being brought into proximity thereto when touchscreen or touchpad 10 is operating the first finger touch mode.

FIG. 3 further shows active stylus 64 having barrel button 67 disposed at a distal end thereof. In one embodiment of active stylus 64, barrel button or switch 67 is located at a distal end thereof and is configured to engage surface 14 of touchscreen or touchpad 10 when a user employs active stylus 64 to write, or to select, characters or symbols displayed or shown on touchscreen or touchpad 10. Barrel button or switch 67 may also be configured to actuate or trigger operation of touchscreen or touchpad 10 in a second active stylus mode when depressed or placed on or near surface 14. In a preferred embodiment, active stylus 64 comprises stylus driving circuitry that is configured to generate active signal 69 emitted thereby, where active signal 69 is a radio frequency or RF signal. Such stylus driving circuitry may be incorporated into an integrated circuit housed within active stylus 64, and may be powered by various means, such as one or more primary or rechargeable batteries included in active stylus 64, or one or more capacitors which may be charged by capacitor charging circuitry when active stylus 64 is placed in a stylus holder or in a recess formed in device 100. If the one or more batteries employed in active stylus 64 are rechargeable, they may be charged be charged by battery charging circuitry when active stylus 64 is placed in a stylus holder or in a recess formed in device 100. Representative RF frequencies of active signal 69 generated by the stylus driving circuitry range may between about 120 kHz and about 130 kHz. Note that in a preferred embodiment, active signal 69 emitted by active stylus 64 mimics the amplitude, phase and frequency of a preferred square wave output by drive electrodes 63 when such drive electrodes are operating in the first finger touch mode.

Figure 4:
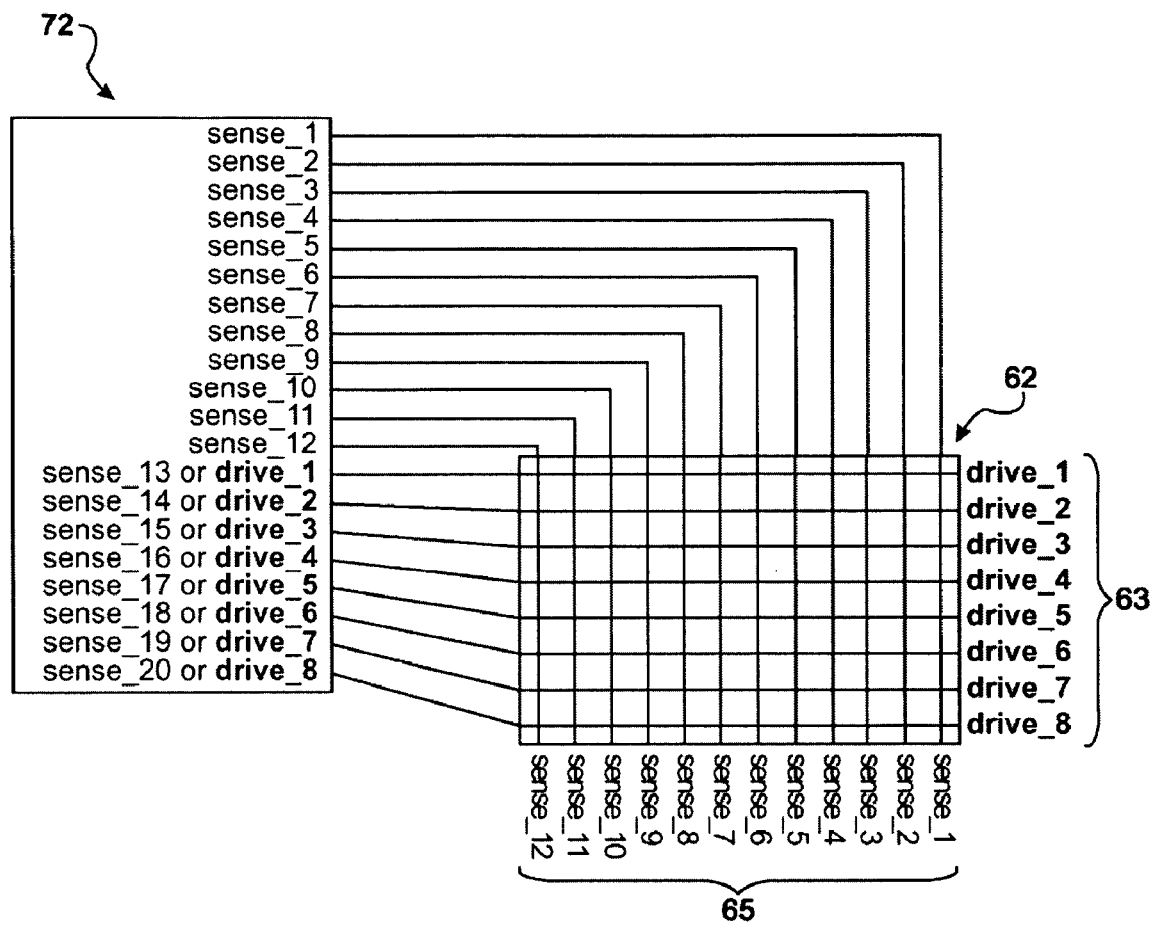
FIG. 4 shows electrode driving and sensing circuitry 72 and electrode array 62 according to one embodiment when operating in a first finger touch mode.
Figure 5:
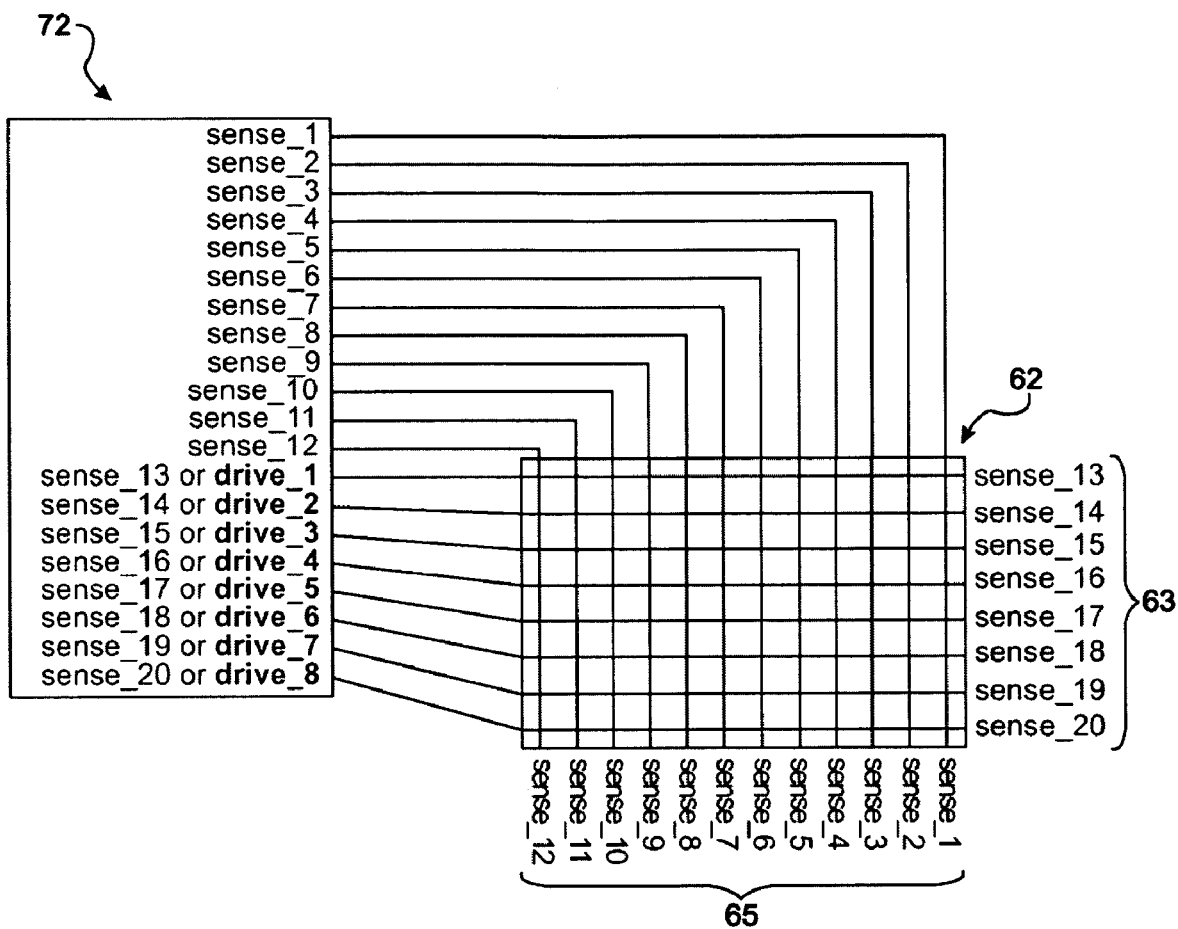
FIG. 5 shows electrode driving and sensing circuitry 72 and electrode array 62 according to one embodiment when operating in a second active stylus mode.

Active stylus 64 is operational when touchscreen or touchpad 10 is operating in the second active stylus mode, where all the first rows or columns of drive electrodes 63 (which in the second mode are operating as sense electrodes) and all the second rows or columns of sense electrodes 65 are scanned substantially simultaneously by electrode sensing circuitry 72 (see FIGS. 4 and 5). That is, drive electrodes 63 are converted from operating as drive electrodes in a first finger touch mode to operating as sense electrodes in a second active stylus mode, where all electrodes 63 and 65 operate as sense electrodes. Operating in such a manner requires that A/D converters be provided for each of the signal lines routed to the drive electrodes in a fashion similar to that of the A/D converters currently provided in the AVAGO™ AMRI-2000 integrated circuit. In one embodiment, and as mentioned above, active signal 69 emitted by active stylus 64 is a radio frequency ("RF") signal. The position of active signal 69 on touchscreen or touchpad 10 is sensed by drive electrodes 65 (converted to operation as additional sense electrodes when touchscreen or touchpad 10 is operating in the second active stylus mode) and sense electrodes 63. The precise location of barrel button or switch 67 on touchscreen or touchpad 10 is preferably interpolated between adjoining electrodes in accordance with location interpolation techniques well known to those skilled in the art.

The second active stylus mode of touchscreen or touchpad 10 may be activated in a number of different ways, such as by, for example, removing active stylus 64 from a stylus holder integrated into portable electronic device 100, actuating barrel button or switch 67 disposed at or near a tip of active stylus 64, or de-actuating barrel button or switch 67 disposed at or near a tip of active stylus 64. Alternatively, active stylus 64 may be actuated by a user depressing or otherwise actuating a switch located on the top or side of active stylus 64 in a manner similar to that employed, for example, when actuating a ball-point pen for use. Those skilled in the art will now recognize that myriad other techniques may be employed to cause operation of touchscreen or touchpad 10 to switch from the first mode to the second mode, or vice-versa.

Active stylus 64 may be configured for wireless operation, or with a wire connecting stylus 64 to device 100. In some embodiments, active stylus 64 is batteryless and may be, for example, configured to harvest electromagnetic energy from an in-range reader of the type employed in some RFID systems. Active stylus 64 may also be configured to power an integrated circuit disposed therein which employs the harvested electromagnetic energy as a power source. Various inductive means and methods know to those skilled in the art may also be employed to power active stylus 64. In another embodiment, RF or other control encoded signals generated by appropriate circuitry disposed within device 100 are transmitted to active stylus 64, where they are decoded and converted into active signal 69 for emission from active stylus 64. The electrical energy required to power the stylus driving circuitry may be harvested from the encoded signal that has been transmitted by device 100 and received by active stylus 64. Active signal 69 emitted by active stylus 64 may further be configured to contain encoded frequency or phase information that may be employed by electrode driving and sensing circuitry 72 to maintain synchrony between active stylus 64 and touchscreen or touchpad 10.

Referring now to FIG. 4, there is shown capacitance sensing circuit 72 when electrode array 62 and circuit 72 are operating in a first finger touch mode. In such a first mode, drive electrodes 63 have drive signals provided thereto in sequential fashion, which drive signals interact with and are sensed by sense electrodes 65. In one embodiment, the values of the individual capacitances associated with sense electrodes 65 and drive electrodes 63 are monitored or measured by capacitance sensing circuit 72 (see, e.g., FIG. 6), as are the operating states of any additional switches that might be provided in conjunction therewith. In a preferred embodiment, a 125 kHz square wave drive signal is applied to drive electrodes 63 by capacitance sensing circuit 72 (see, e.g., FIG. 6) so that the drive signal is applied continuously to drive electrodes drive_1 through drive_8, although those skilled in the art will understand that other types of drive signals may be successfully employed. Indeed, the drive signal need not be supplied by capacitance sensing circuit 72, and in some embodiments is provided by a separate drive signal circuit. In a preferred embodiment, however, the drive signal circuit and the capacitance sensing circuit are incorporated into a single circuit or integrated circuit 72. Further in a preferred embodiment, the precise position of a user's finger on touchscreen or touchpad 10 in respect of the electrode array 65 is interpolated between electrodes.

Referring now to FIG. 5, there is shown capacitance sensing circuit 72 when electrode array 62 and circuit 72 are operating in a second active stylus mode. In such a second mode, drive electrodes 63 have no drive signals provided thereto and instead operate as sense electrodes sense_13 through sense_20 in addition to sense electrodes sense_1 through sense_12. In one embodiment, the values of the individual capacitances associated with sense electrodes 65 and drive electrodes 63 operating as sense electrodes are monitored or measured by capacitance sensing circuit 72 (see, e.g., FIG. 6), as are the operating states of any additional switches that might be provided in conjunction therewith. When touchscreen or touchpad 10 and circuit 72 are operating in the second active stylus operating mode, all of electrodes sense_1 through_20 are activated to operate as sense electrodes only, and are configured to detect the location of active signal 69 on touchpad or touchscreen 10. That is, all the first rows or columns of the drive electrodes operating as sense electrodes and all the second rows or columns of the sense electrodes are scanned simultaneously by electrode driving and sensing circuitry 72 when touchscreen or touchpad 10 is operating in the second mode. In a preferred embodiment, sense electrodes sense_1 through sense_20 and circuit 72 are configured to detect and interpolate the location of the strongest active signal 69 emitted by active stylus 64 on or near touchscreen or touchpad 10. Also in a preferred embodiment, the drive signal circuit and the capacitance sensing circuit are incorporated into a single circuit or integrated circuit 72. Note further that electrode driving and sensing circuitry 72 in FIGS. 4 and 5 further comprises A/D converters for each of the first rows or columns of drive electrodes 63, where the A/D converters are configured to permit the first rows or columns of drive electrodes 63 to operate as sense electrodes when the touchscreen or touchpad is operating in the second mode.

Figure 6:
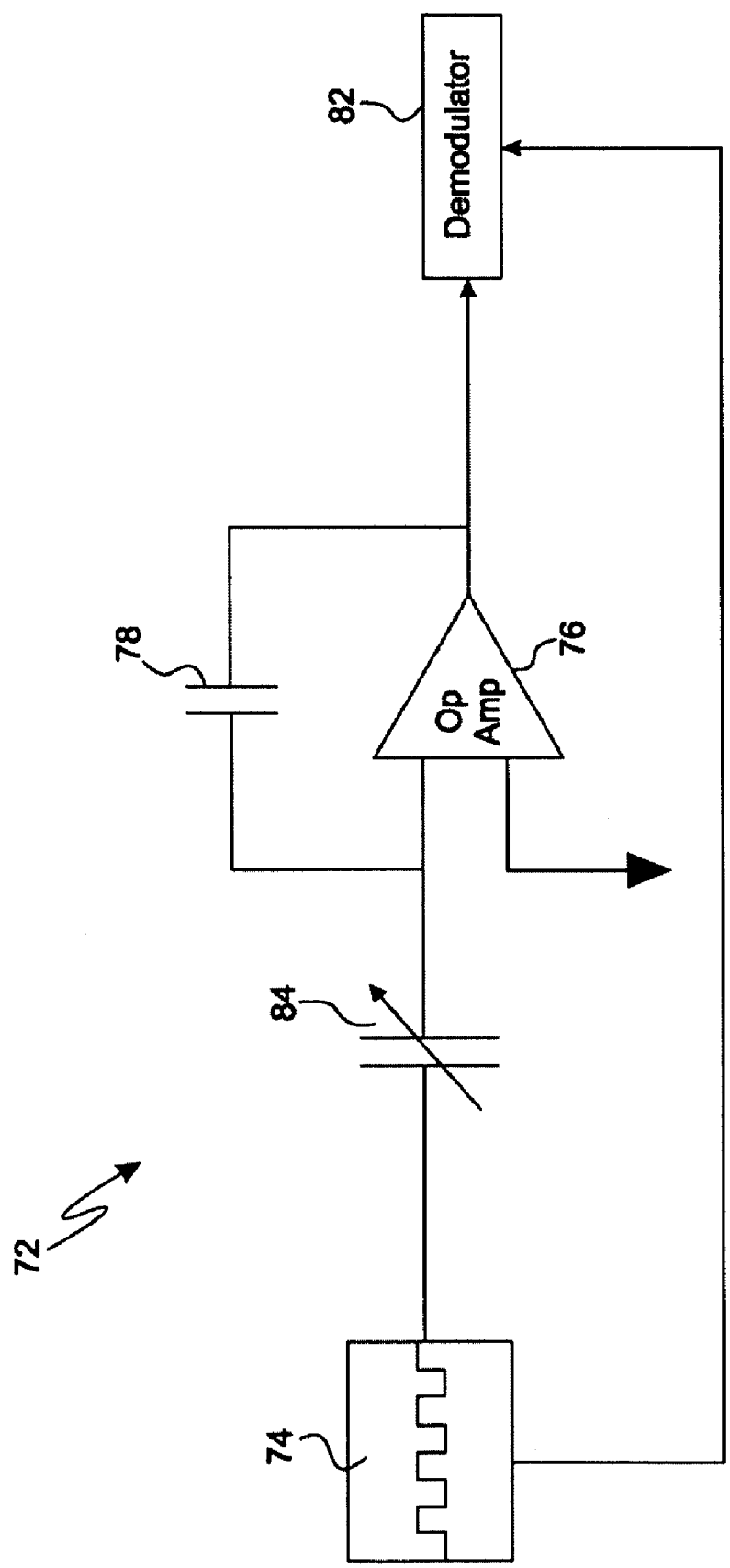
FIG. 6 shows electrode driving and sensing circuitry 72 according to one embodiment.

FIG. 6 shows one embodiment of a circuit for driving and sensing touchscreen or touchpad 10. By way of example, a modified AVAGO™ AMRI-2000 integrated circuit may be employed to perform the functions of capacitance sensing circuit 72, where such integrated circuit is modified in accordance with the teachings set forth above respecting configuring drive electrodes 63 so that they may operate as drive electrodes when touchscreen or touchpad 10 is operating in the first mode, and as additional sense electrodes when touchscreen or touchpad 10 is operating in the second mode.

While operating in the first finger touch mode, a low-impedance AC waveform (e.g., a 100 kHz square wave) is provided to a drive electrode 21 (not shown in FIG. 6, but see FIGS. 1 and 2) by signal generator 74. Operational amplifier 76 with feedback capacitor 78 is connected to a sense electrode, and holds the sense line at virtual ground. Amplifier 76 acts as a charge to voltage converter, providing a voltage measurement of the charge induced through capacitor 78. Synchronous demodulation is effected by demodulator 82 and, with subsequent filtering, is used to extract low-frequency amplitude changes caused by changes in the sensed capacitance. Variable capacitor 84 indicates the mutual capacitance between drive and sense electrodes, as modulated by the presence of a finger. Feedback capacitor 78 sets the gain of touchscreen or touchpad 10. Those skilled in the art will appreciate that many circuits other than that shown in FIG. 6 may be employed to drive and sense electrode array 62 of the invention.

Output signals provided by electrode array 62 and circuit 72 are preferably routed to a host processor via, for example, a serial I²C-compatible or Serial Peripheral Interface (SPI) bus. For example, a modified AVAGO™ AMRI-2000 integrated circuit may be programmed to provide output signals to a host processor via such busses. The host processor may use information provided by the AMRI-2000 integrated circuit to control a display.

Figure 7:
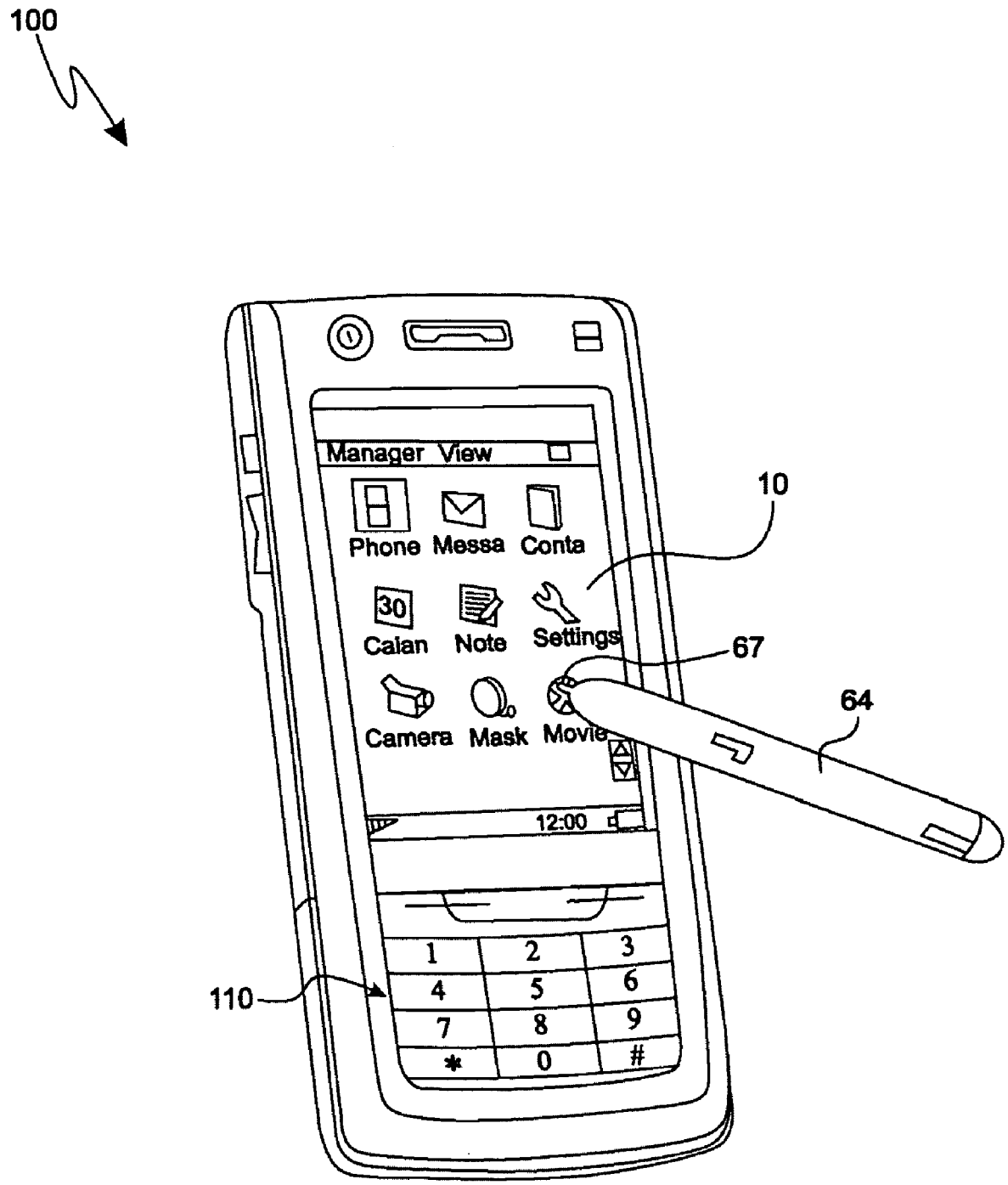
FIG. 7 shows one embodiment of electronic device 100, touchscreen 10 and active stylus 64.

FIG. 7 shows one embodiment of portable hand-held electronic device 100, which comprises touchscreen or touchpad 10, keyboard 110, and active stylus 64 comprising barrel button or switch 67. Active stylus 64 may be housed in a stylus holder or recess disposed within device 100 when not in use.

Examples of portable hand-held electronic devices into which touchscreen or touchpad 10 may be incorporated include LCDs, computer displays, laptop computers, personal data assistants (PDA), mobile or cellular telephones, radios, MP3 players, portable music players, and other devices.

Figure 8:
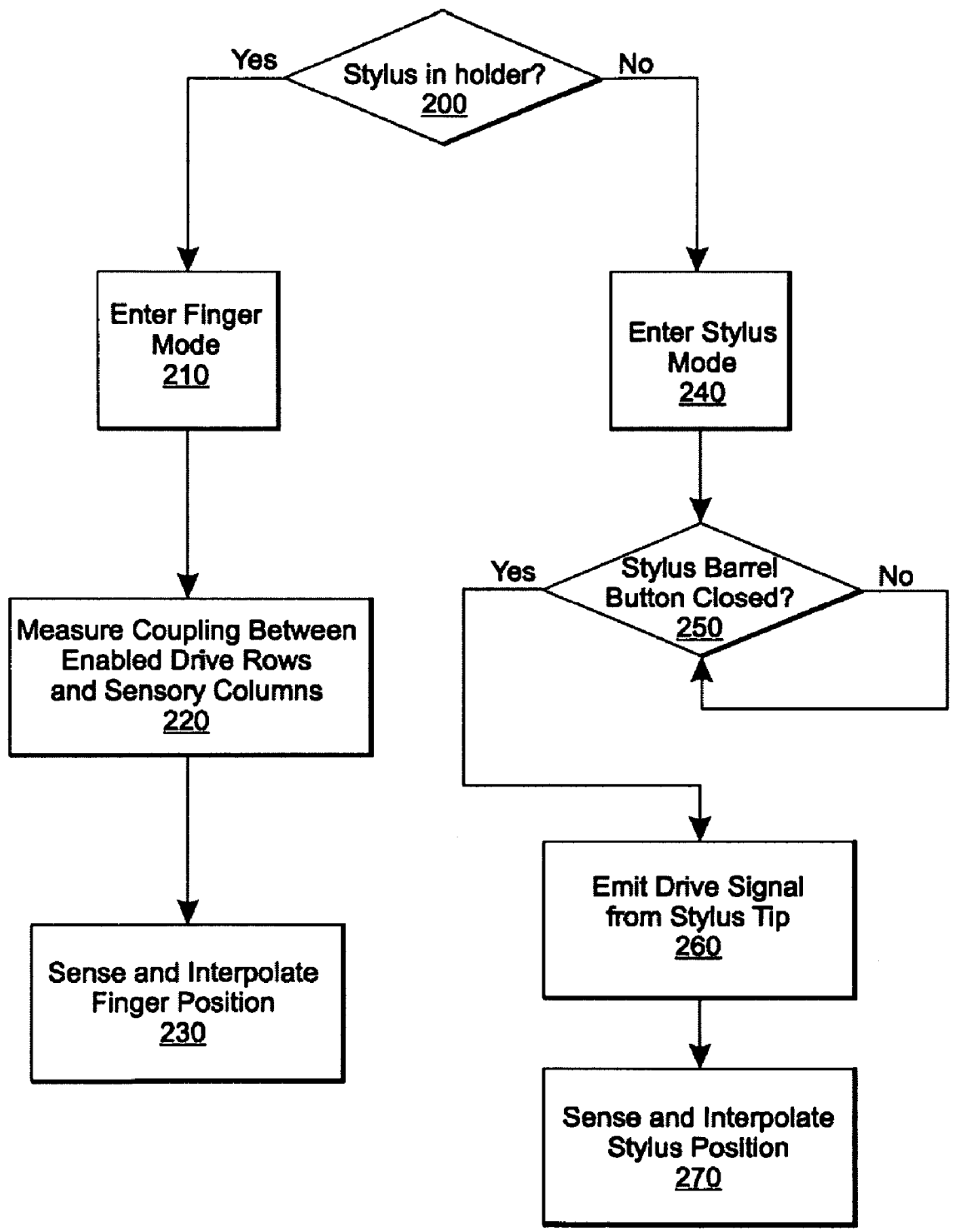
FIG. 8 illustrates one embodiment of a method comprising a first finger mode and a second active stylus mode.

FIG. 8 illustrates one embodiment of a method of operating a touchscreen or touchpad comprising steps 200 through 270. In step 200, it is determined whether active stylus 64 is in the stylus holder or recess. If active stylus 64 is in the stylus holder or recess, or if the second active stylus mode of operation is otherwise not be entered into, device 100 proceeds to operate in the first finger touch mode as outlined by steps 210 through 230, where a user's finger position or location on touchpad or touchscreen 10 is determined. If active stylus 64 is not in the stylus holder or recess, or if the second active stylus mode of operation is otherwise to be entered into, device 100 proceeds to operate in the second active stylus mode as outlined by steps 240 through 270, where the active stylus's position or location on touchpad or touchscreen 10 is determined.

While the primary use of touchscreen or touchpad 10 is believed likely to be in the context of relatively small portable devices, and touchpads or touchscreens therefor, it may also be of value in the context of larger devices, including, for example, keyboards associated with desktop computers or other less portable devices such as exercise equipment, industrial control panels, washing machines and the like. Similarly, while many embodiments of the invention are believed most likely to be configured for manipulation by a user's fingers, some embodiments may also be configured for manipulation by other mechanisms or body parts. For example, the invention might be located on or in the hand rest of a keyboard and engaged by the heel of the user's hand. Furthermore, the invention is not limited in scope to drive electrodes disposed in columns and sense electrodes disposed in rows. Instead, rows and columns are interchangeable in respect of sense and drive electrodes.

Note further that included within the scope of the present invention are methods of making and having made the various components, devices and systems described herein.

The above-described embodiments should be considered as examples, rather than as limiting the scope of the invention. In addition to the foregoing embodiments, review of the detailed description and accompanying drawings will show that there are other embodiments. Accordingly, many combinations, permutations, variations and modifications of the foregoing embodiments not set forth explicitly herein will nevertheless fall within the scope of the invention.

I claim:

1. An electronic device, comprising:
 a mutual capacitance combined finger and active stylus sensing touchscreen or touchpad comprising an outer touch surface, at least one substrate disposed beneath the touch surface, a first plurality of mutual capacitance drive electrodes arranged in first rows or columns on the at least one substrate, a second plurality of mutual capacitance sense electrodes arranged in second rows or columns on the at least one substrate, the first rows or columns not being parallel to the second rows or columns;
 electrode driving and sensing circuitry operably connected to the drive and sense electrodes and configured to permit at least some of the drive electrodes to be switchably configured thereby for operation as either drive electrodes in a first finger touch mode or as additional sense electrodes in a second active stylus mode, and
 an active stylus comprising stylus driving circuitry configured to emit an active signal from the active stylus when the touchscreen or touchpad is operating in the second mode, the active signal having the same amplitude, phase and frequency of a drive signal output by the drive electrodes when the drive electrodes are operating in the first finger touch mode;
 wherein the outer touch surface is configured for a user to place and move the finger or active stylus thereon and thereacross, the first and second pluralities of electrodes form an electrode array, and the electrode driving and sensing circuitry and the electrode array are together configured to permit a first finger position on the outer touch surface to be detected capacitively thereby when operating in the first mode and to detect a second active signal location on the outer touch surface to be detected capacitively thereby when operating in the second mode.

2. The electronic device of claim 1, wherein the second rows or columns of the sense electrodes are scanned sequentially by the electrode driving and sensing circuitry when the touchscreen or touchpad is operating in the first mode.

3. The electronic device of claim 1, wherein all the first rows or columns of the drive electrodes and all the second rows or columns of the sense electrodes are scanned substantially simultaneously by the electrode driving and sensing circuitry when the touchscreen or touchpad is operating in the second mode.

4. The electronic device of claim 1, wherein the finger position in respect of the electrode array is interpolated between electrodes.

5. The electronic device of claim 1, wherein the active stylus position in respect of the electrode array is interpolated between electrodes.

6. The electronic device of claim 1, wherein the second rows or columns of electrodes are substantially perpendicular to the first rows or columns of electrodes.

7. The electronic device of claim 1, wherein the first plurality of drive electrodes is disposed on a first surface of the at least one substrate, and the second plurality of sense electrodes is disposed on a second surface of the at least one substrate, the first and second surfaces opposing one another.

8. The electronic device of claim 1, wherein the first and second pluralities of electrodes are disposed substantially in a single plane.

9. The electronic device of claim 1, wherein a spacing between rows or columns of at least one of the first plurality of electrodes and the second plurality of electrodes ranges between about 1 mm and about 10 mm.

10. The electronic device of claim 1, wherein at least one of the first and second pluralities of electrodes comprises indium tin oxide (ITO).

11. The electronic device of claim 1, wherein at least one of the at least one substrate and the touch surface comprises at least one of glass, plastic and acrylic.

12. The electronic device of claim 1, wherein at least one of the at least one substrate and the touch surface is substantially optically transparent.

13. The electronic device of claim 1, wherein the touchscreen or touchpad is configured to sense multiple touch locations in the array substantially simultaneously.

14. The electronic device of claim 1, wherein the electrode driving and sensing circuitry further comprises an electrode drive signal circuit operably connected to the first plurality of electrodes and configured to provide electrical drive signals thereto.

15. The electronic device of claim 1, wherein at least portions of the electrode driving and sensing circuitry are incorporated into an integrated circuit.

16. The electronic device of claim 1, wherein the electrode driving and sensing circuitry further comprises A/D converters for each of the first rows or columns of drive electrodes, the A/D converters being configured to permit the first rows or columns of drive electrodes to operate as sense electrodes when the touchscreen or touchpad is operating in the second mode.

17. The electronic device of claim 16, wherein the active signal emitted by the active stylus contains encoded frequency or phase information that may be employed by the electrode driving and sensing circuitry to emit a synch signal for reception by the active stylus to maintain synchrony between the active stylus and the touchscreen or touchpad.

18. The electronic device of claim 1, wherein the active signal is a radio frequency ("RF") signal, the RF signal determining capacitive detection of the second active signal location on the outer touch surface.

19. The electronic device of claim 1, wherein the second mode is activated when the active stylus is removed from a stylus holder.

20. The electronic device of claim 1, wherein the second mode is activated when a barrel button disposed at or near a tip of the active stylus is actuated.

21. The electronic device of claim 1, wherein the second mode is activated when a barrel button disposed at or near a tip of the active stylus is de-actuated.

22. The electronic device of claim 1, wherein the first mode is activated when the active stylus placed in a stylus holder.

23. The electronic device of claim 1, wherein the active stylus is wireless or batteryless.

24. The electronic device of claim 1, wherein the active stylus is configured to harvest electromagnetic energy from an in-range reader operably connected to the electronic device.

25. The electronic device of claim 24, wherein the active stylus is configured to power an integrated circuit disposed therein using the harvested electromagnetic energy.

26. The electronic device of claim 1, wherein the electronic device is at least one of an LCD, a computer display, a laptop computer, a personal data assistant (PDA), a mobile telephone, a radio, an MP3 player, a portable music player, a stationary device, a television, a stereo, an exercise machine, an industrial control, a control panel, an outdoor control device and a washing machine.

27. A method of sensing a position of a finger or an active stylus on a touchscreen or touchpad, comprising:
    detecting, in a first finger touch mode, a first position of the finger on the touchscreen or touchpad when a mutual capacitance changes between a first plurality of electrodes and a second plurality of electrodes near the first position, the first and second pluralities of electrodes forming an electrode array in the touchscreen or touchpad, and
    detecting, in a second active stylus mode, a second position of the active stylus on the touchscreen or touchpad when an active signal emitted by the active stylus is detected by the first plurality of electrodes and the second plurality of electrodes near the second position, the active signal having the same amplitude, phase and frequency of a drive signal output by the first plurality of electrodes when the first plurality of electrodes is operating in the first finger touch mode.

* * * * *